United States Patent [19]

Abbott

[11] Patent Number: 4,735,334
[45] Date of Patent: Apr. 5, 1988

[54] DISPENSING CLOSURE

[75] Inventor: Jerry A. Abbott, Corydon, Ky.

[73] Assignee: Sunbeam Plastics Corporation, Evansville, Ind.

[21] Appl. No.: 893,992

[22] Filed: Aug. 7, 1986

[51] Int. Cl.⁴ ............................................. B65D 47/00
[52] U.S. Cl. ..................................... 220/259; 222/546
[58] Field of Search ............... 222/545, 546, 556, 563; 220/254, 256, 259, 375

[56] References Cited

U.S. PATENT DOCUMENTS

| | | | |
|---|---|---|---|
| 2,851,203 | 9/1958 | Nowak | 222/546 |
| 3,378,168 | 4/1968 | Hildebrandt | 222/546 |
| 4,133,462 | 1/1979 | Lindstrom | 222/546 |
| 4,234,099 | 11/1980 | Tarro | 220/270 |
| 4,625,898 | 12/1986 | Hazard | 222/546 |

*Primary Examiner*—Stephen Marcus
*Assistant Examiner*—Nova Stucker
*Attorney, Agent, or Firm*—Irvin L. Groh; Alfred L. Patmore, Jr.

[57] ABSTRACT

A closure having a dispensing orifice in the top of a threaded cap which is closed by a lid hinged to the cap. A thin membrane extends inwardly from the periphery of the orifice, and a closure plug on the lid engages the orifice and stretches the membrane downwardly to seal the plug. The method of manufacture and sealing is presented.

6 Claims, 2 Drawing Sheets

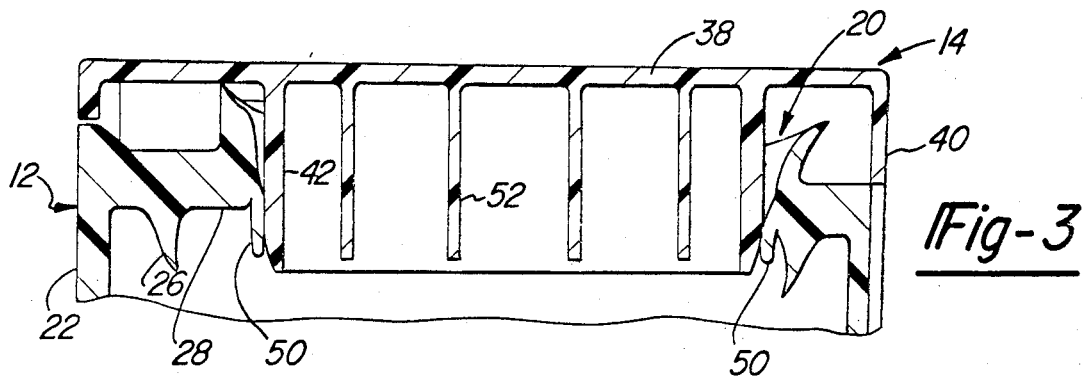
Fig-3
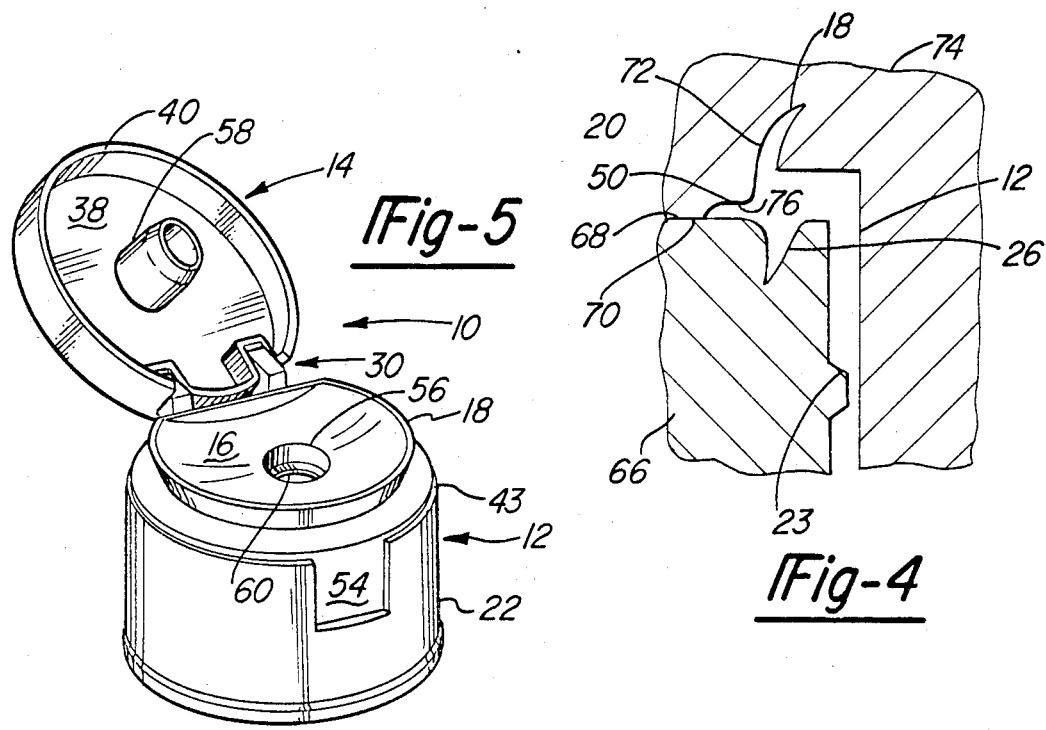
Fig-5
Fig-4
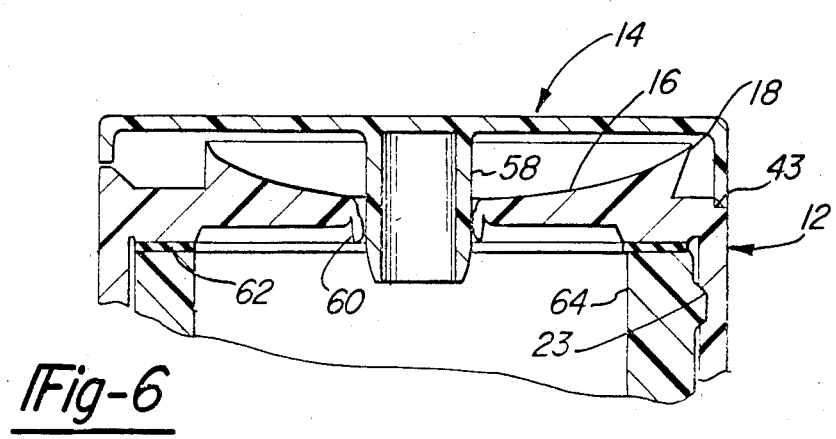
Fig-6

DISPENSING CLOSURE

This invention relates to a dispensing closure, and, more particularly, to a closure having a base cap containing a dispensing orifice in its top and a lid hinged to the cap for closing the orifice.

Dispensing closure are commonly constructed with a base cap having means for attachment to a container such as threads in the skirt of the cap or a bead in the skirt which snaps over corresponding flange on the neck of the container. The dispensing orifice is usually located in the top of the cap and a lid is hinged to the cap to close over the dispensing orifice.

In a closure used for dispensing a liquid from the container, a plug is usually provided on the bottom side of the lid so as to seal the dispensing orifice when the lid is swung to its closed position. In order to provide adequate sealing, it is necessary to maintain close tolerances between the plug size and the orifice size, usually providing a slight forced fit of the plug and the orifice. This adds to the expense of manufacture. When the dispensing orifice is of an irregular shape, such as a slot, the sealing problem becomes more acute even where close tolerances are maintained. This is due in part to the necessity for providing proper clearances for swinging the plug into sealing position around the hinge axis. Even where the necessity for providing swinging clearance has been eliminated, for example, in a strap-type of hinge, the maintenance of proper sealing tolerances is difficult.

It is, therefore, an object of this invention to provide a dispensing closure with means to completely seal the dispensing orifice.

It is another object of this invention to provide a dispensing closure having a closure plug on its lid for sealing the orifice without the need for maintaining close force fit tolerances between the plug and orifice.

It is still another object of this invention to provide a dispensing closure with an irregularly shaped dispensing orifice which can be completely sealed when its lid is swung into a closed position.

It is another object of this invention to provide a method of manufacturing a dispensing closure by the use of a simple removable core mold even where the dispensing orifice is of an irregular shape or is off center relative to the axis of the cap.

It is still another object of this invention to provide a sealing method for the dispensing orifice which retains its integrity with continuing use.

The foregoing objectives of this invention and other advantages have been accomplished in a dispensing closure in which a cap has a dispensing orifice located in its top and the means for attaching the cap to a container is located in the cap skirt, typically as internal threads for attachment to a threaded container neck. The lid is hinged to the cap for closing over the cap. The lid has a downwardly extending closure plug which engages the orifice as the lid is swung to its closed position. A thin flexible membrane extends inwardly from the periphery at the inside end of the orifice. This membrane is located in the plane of the inside surface of the cap top, that is, in what would conventionally be termed a horizontal plane. As the closure plug is pushed into the dispensing orifice, it pushes the membrane downwardly stretching it into sealing engagement with the periphery of the plug.

The dispensing orifice can be a simple round hole or of an irregular shape such as a rectangular slot or a tear-drop shape to provide a larger rounded end remote from the hinge through which the liquid flows and a smaller rounded end closer to the hinge axis to provide a space for venting air.

The closure is manufactured from a thermoplastic material by an injection molding process by a method not requiring intricate spring-apart mold cavities. This is accomplished by molding the lid separately with a portion of a dual post and slot hinge member formed therein and a closure plug extending from the inner surface thereof. The cap is molded with a complementary dual post and slot hinge member. The internal cap threads are formed by a removable core member which is unthreaded after the cap has been formed. The core has a plannar top which coacts with the plannar surface on a molding plug which projects from the stationary die member. These plannar surfaces are held in abutment with each other during the molding process.

The flexible membrane is simultaneously formed as a flash into a mold cavity formed by a peripheral recess on the molding plug and the plannar top of the removable core member. The core member is unthreaded to release the cap member from the mold cavity. The closure is completed by snapping the post and slot hinge members together.

The method of sealing the dispensing the orifice involves the steps of swinging the lid in a closing direction over the top of the cap. The closure plug is pushed into the dispensing orifice. The plug is further pushed against the flexible membrane to deflect it downwardly, and finally, continuing movement of the closure plug past the membrane stretches the membrane into sealing conformity around the periphery of the plug.

The preferred embodiments of the invention are illustrated in the drawing in which:

FIG. 3 is a partial sectional view similar to FIG. 2 showing the lid completely closed with the closure plug inserted in the dispensing orifice and deforming the sealing membrane into sealing contact around the periphery of the plug;

FIG. 4 is partial sectional view of the primary mold members used to form the cap member of the closure embodying the invention;

FIG. 5 is a perspective view similar to FIG. 1 showing the closure of the invention with a circular orifice and conforming circular or tapered closure plug with the lig shown in an open position;

FIG. 6 is a partial elevational view of the closure of FIG. 5 showing the lid in its fully closed position with the cylindrical plug member inserted in the circular orifice and deforming the flexible membrane into sealing contact with the periphery of the plug.

Figure 1:
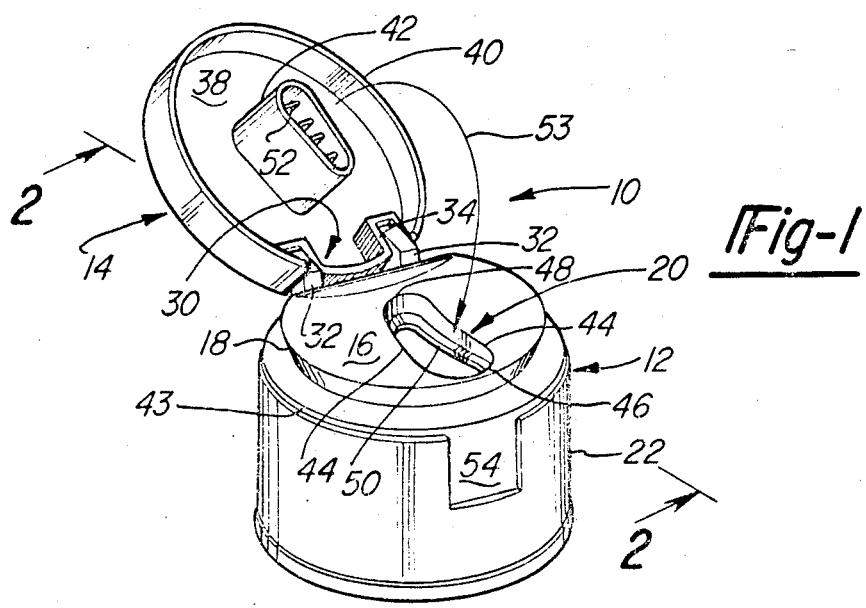
FIG. 1 is a perspective view of the closure having an irregularly shaped dispensing orifice in the form of an elongated slot or tear-drop shape with a conforming shaped plug showing the closure embodying the invention with its lid swung to an open position.
Figure 2:
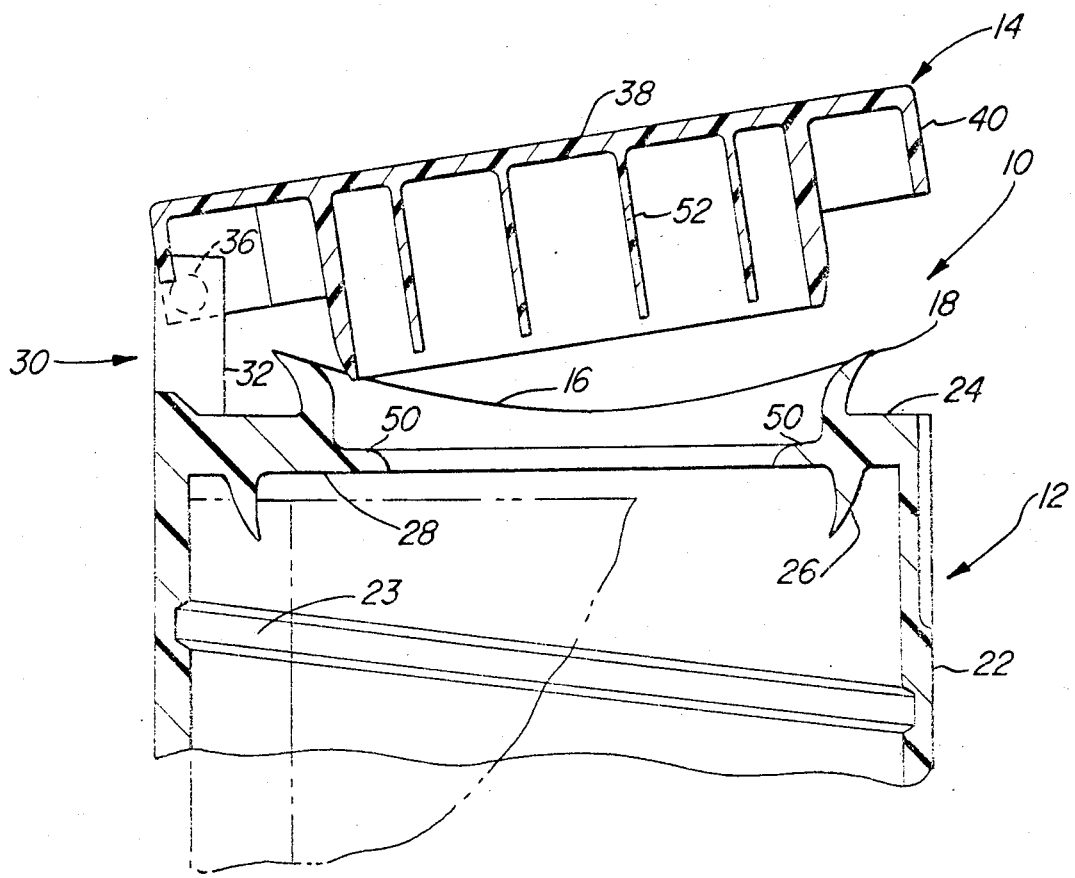
FIG. 2 is an elevational view in section of the closure taken along lines 2—2 of FIG. 1 showing the lid in a partially open position as it is about to engage the dispensing orifice in a closing direction.

As shown in FIGS. 1-3, dispensing closure 10 includes a cap member 12 and a lid member 14. Cap 12 is formed with a generally dish-shaped top 16 which provides a pouring lip 18 surrounding the irregularly shaped dispensing orifice 20. Depending annular cap skirt 22 contains internal threads 23 for screwing the cap onto a conventionally threaded container.

As shown more fully in FIG. 2, the dished top portion 16 projects upwardly from a horizontal flat top portion 24. A cylindrical flange depends concentrically with the cap skirt wall 22 from the inside cap surface 28 to act as a seal when the cap is threaded onto a container neck. Flange 26 is conventionally known as a crab-claw seal and is constructed with a tapering surface so that it is flexible and can yieldingly seal against the top lip of the container neck.

A dual post and slot hinge 30 joins the cap 12 and the lid 14, providing an extremely stable hinge while allowing the lid and cap to be molded separately. As more fully set forth in U.S. patent application, Ser. No. 825,464 filed Feb. 3, 1986, in the name of Bush, for a Two-Piece Closure, this take-apart hinge 30 is constructed with a pair of posts 32 extending upwardly from cap 12 which engage slots 34 formed in lid member 14. Each post has a spherical projection shown generally at 36 which engages a complementary concave indentation in the walls forming the slots 34 to provide a hinge axis. The slots 34 in lid 14 are aligned to receive the cap post 32 and indentations 36 to snap the lid 14 onto the cap 12 at this hinged joint 30. The lid 14 has a generally flat top 38 and a depending cylindrical skirt 40. The cap top portion 24 is recessed around its periphery at 43 to receive the lid skirt 40 in flush alignment.

Depending from the lid top 38 is a sealing plug 42 having an irregular shape conforming to the shape of orifice 20. The generally tear-shaped orifice 20 is formed with sides 44 which converge from a larger rounded pouring end 46 to a smaller rounded air vent end 48 of the orifice.

A flexible sealing membrane 50 extends horizontally inward from the periphery of orifice 20 in the plane of inside top cap wall 28. This membrane has a thickness of 0.008-0.015 inches and extends inwardly approximately 1/32 inch. As the lid 14 is swung from an open position as shown in FIG. 1 to a closing position along the path shown by arrow 53, the plug 42 will engage the orifice walls 20 and be guided inwardly to push against the flexible membrane 30 bending it downwardly. Continuing movement of the plug 42 past the membrane 50 acts to stretch the membrane into sealing conformity around the periphery of the plug as shown in FIG. 3. This unique membrane provides a liquid tight seal of the dispensing orifice providing a controlled holding tension and sealing pressure on the sides of the plug while absorbing the irregularities in the shape between the plug and the orifice which would otherwise generate leakage paths. This membrane seal excels over the less effective force or interference type of fit which requires extremely close tolerances of the order of 0.001-0.002 inches in the plug and orifice sizing. The plug 42 is molded with a hollow interior and reinforcing cross ribs 52. The membrane seal also allows a lower and more controlled closing force which keeps the package sealed even if it is accidentally dropped. The cap skirt 22 is provided with a finger recess 54 allowing the lid 14 to be pushed upwardly against the sealing pressure for opening.

FIGS. 5 and 6 shows the closure 10 constructed with a circular orifice 56 and corresponding cylindrical sealing plug 58. The closure is similar in all other respects to the closure of FIGS. 1-3, having a thin annular membrane extending inwardly in a horizontal plane which is forced downwardly and stretched in conformity with the sealing plug 58. As shown in FIG. 6, a resilient sealing gasket 62 replaces the crab-claw flange 26 to seal the top of cap 12 to the lip of container neck 64.

In the manufacture of the closure 10, the lid is molded separately with its portion of the dual post and slot hinge member 30 and its closure plug 42 or 58. The cap is molded with a complementary dual post and slot hinge portion and a dispensing orifice 20 or 56 extending through the cap top. As shown in FIG. 4, the removable core member 56 forms the interior of the cap including the threads 23 and annular sealing flange 26. The removable core member 66 has a plannar top 68 which is held in abutment with the flat plannar surface 70 of the molding plug 72 which extends from the stationary die member 74 to form the orifice 20 or 56. The flexible membrane 50 is formed as a flash into a mold cavity formed by a peripheral recess 76 on the molding core and the plannar top of the molding plug. The molding core 66 is unthreaded to release the cap member from the mold cavity. The closure 10 is completed by snapping the post and slit hinge members 30 together.

The sealing of the dispensing orifice is accomplished by the method of swinging the lid in a closing direction over the top of the cap while pushing the closure plug into the orifice. The further pushing of the closure plug against the flexible membrane deflects the membrane downwardly, and still further movement of the plug past the membrane stretches the membrane into sealing conformity with the periphery of the plug.

The horizontal disposition of the sealing membrane allows the molding core to rotate whether or not the orifice is round or irregularily shaped or whether or not it is located in the cap axis to permit unthreading of the core to release the cap.

The embodiments of the invention in which an exclusive property is claimed are defined as follows:

1. A dispensing closure for a threaded container comprising, in combination: a cap having a top and a cylindrical skirt depending therefrom with internal threads for attachment to said threaded container; a dispensing orifice extending through said top with a thin flexible membrane extending inwardly from the periphery of said orifice coplanar with the inside surface of said top forming a rim surrounding a central open portion of said orifice; a lid hinged to said cap for closing over the top of said cap; said lid having a downwardly extending closure plug of uniform cross section for engaging said orifice as the lid is swung to its closed position and engaging said membrane rim stretching it downward in sealing engagement around the periphery of said plug.

2. The closure of claim 1 wherein said orifice is round and said membrane forms an annular rim which engages a cylindrical closure plug.

3. The closure of claim 1 wherein said orifice is formed as a slot and said closure plug and membrane rim have conforming shapes whereby said membrane rim seals around the periphery of said plug.

4. The closure of claim 3 wherein said orifice is elongated in a direction generally perpendicular to the hinge axis and rounded at each end thereof.

5. The closure of claim 4 wherein the elongated dispensing orifice is formed with sides converging from a larger rounded end to a smaller rounded end.

6. The method of sealing a dispensing orifice in a closure for a threaded container, said closure comprising: a cap having a top and a cylindrical skirt depending therefrom with internal threads for attachment to said threaded container; a dispensing orifice extending through said top with a thin flexible membrane extending inwardly from the periphery of said orifice coplanar with the inside surface of said top forming a rim surrounding a central open portion of said orifice; a lid hinged to said cap for closing over the top of said cap; said lid having a downwardly extending closure plug of uniform cross section, said method comprising the steps of swinging said lid in a closing direction over the top of said cap; pushing said closure plug into said orifice; pushing said closure plug against said flexible membrane rim to push the membrane rim downwardly, and continuing the movement of said closure plug past said membrane rim to stretch the membrane rim downwardly from the inside surface of said top into sealing conformity around the periphery of said plug.

* * * * *